March 6, 1945.     C. T. RASMUSSEN ET AL     2,370,914
DUSTING MACHINE
Filed July 11, 1941     3 Sheets-Sheet 1

INVENTORS
Clarence T. Rasmussen
Robert D. Griff
BY

March 6, 1945.  C. T. RASMUSSEN ET AL  2,370,914
DUSTING MACHINE
Filed July 11, 1941  3 Sheets-Sheet 2
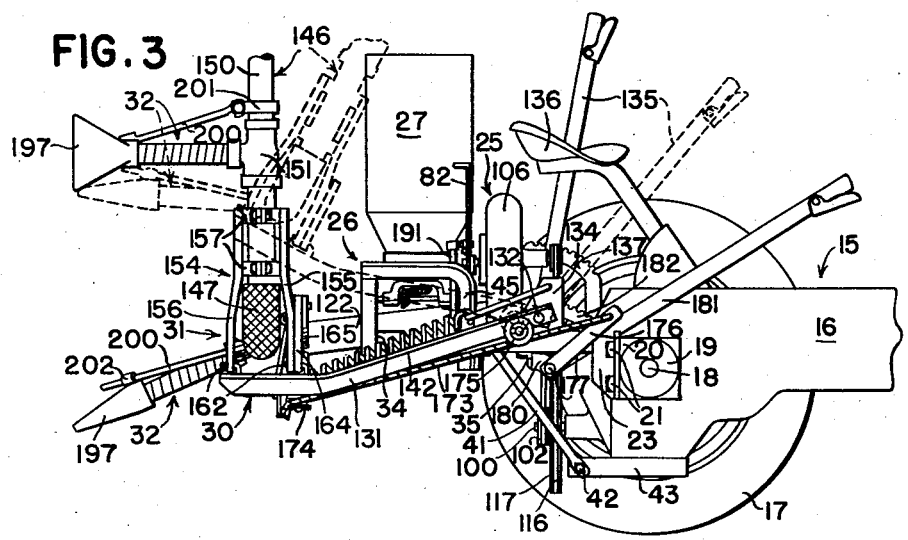
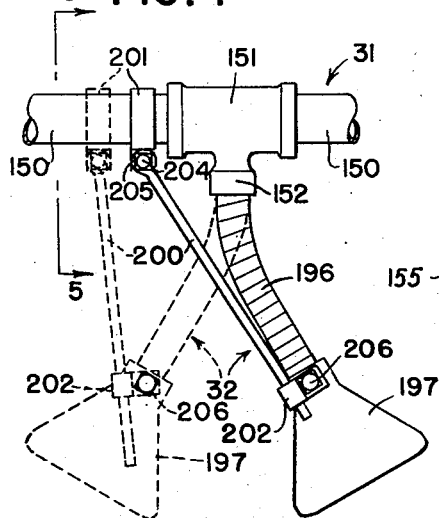
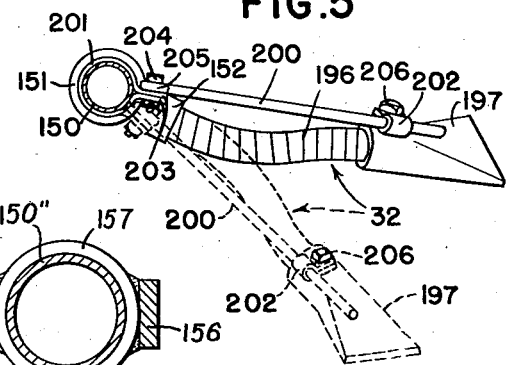
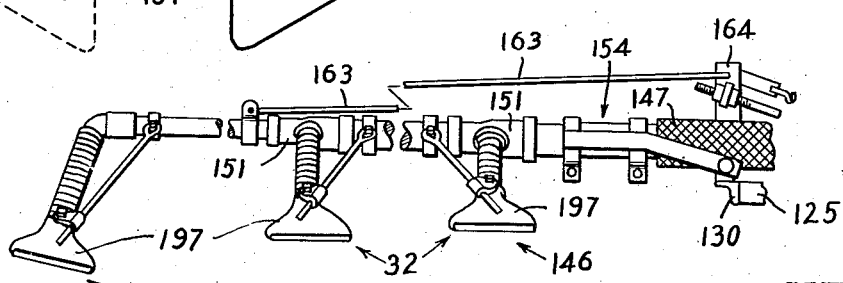
INVENTORS
Clarence T. Rasmussen
Robert D. Griff
BY March 6, 1945.   C. T. RASMUSSEN ET AL   2,370,914
DUSTING MACHINE
Filed July 11, 1941   3 Sheets-Sheet 3

INVENTORS
Clarence T. Rasmussen
Robert D. Griff

Patented Mar. 6, 1945

2,370,914

UNITED STATES PATENT OFFICE 2,370,914

DUSTING MACHINE

Clarence T. Rasmussen, Moline, and Robert D. Griff, Rock Island, Ill., assignors to Deere & Company, Moline, Ill., a corporation of Illinois Application July 11, 1941, Serial No. 402,038

29 Claims. (Cl. 43—148)

The present invention relates to agricultural implements and is more particularly concerned with that class of implements known as crop dusters which are used to distribute finely divided insecticide or fungicide powder over the growing crop to control pests and crop disease. The principal object of our invention is to provide a new and improved crop duster having great flexibility to meet a wide range of field conditions and to allow the implement to be used in the treatment of a wide variety of crops, particularly those crops grown in rows. One of the features of the invention lies in the novel arrangement and construction of the distributing conduit and supporting structure therefor which provides the maximum range of row width spacing and nozzle height adjustment, and which also enables the laterally extending pipes to be folded up out of the way for storage or when the implement is in transit to and from the field.

A further object of our invention is the provision of a novel arrangement for mounting the blower fan and main duct on the supporting frame permitting tension adjustment of the fan driving belt without the use of idler pulleys.

Another object of the present invention is the provision of novel means for raising and lowering the outrigger distributing pipes, and for holding the pipes firmly against vertical oscillation when they are down in operating position.

Still another object relates to the provision of improved means for interrupting the flow of material from the feed hopper into the distributing conduit. Further, in this connection, it is one of the objects of this invention to provide an improved feed control mechanism which is actuated by the outrigger elevating mechanism so that the flow of material from the hopper is automatically interrupted when the outriggers are raised to transport position.

Other objects and advantages of our invention will become apparent to those skilled in the art after consideration of the following detailed description of the preferred embodiment thereof, reference being had to the accompanying drawings, in which Figure 1 is a top plan view of a tractor mounted crop duster embodying the features of our invention;

Figure 3 is a side elevation of the same, with the near traction wheel removed to show more clearly certain details of construction;

Figure 4 is an enlarged top plan view of one of the nozzle pipes, showing two positions of lateral adjustment;

Figure 5 is a view taken along the line 5—5 in Figure 4, showing the nozzle pipe in two positions of vertical adjustment;

Figure 6 is an enlarged sectional view taken along the line 6—6 in Figure 2;

Figure 11 is a fragmentary view showing one of the outer pivoted conduit sections.

Figure 1:
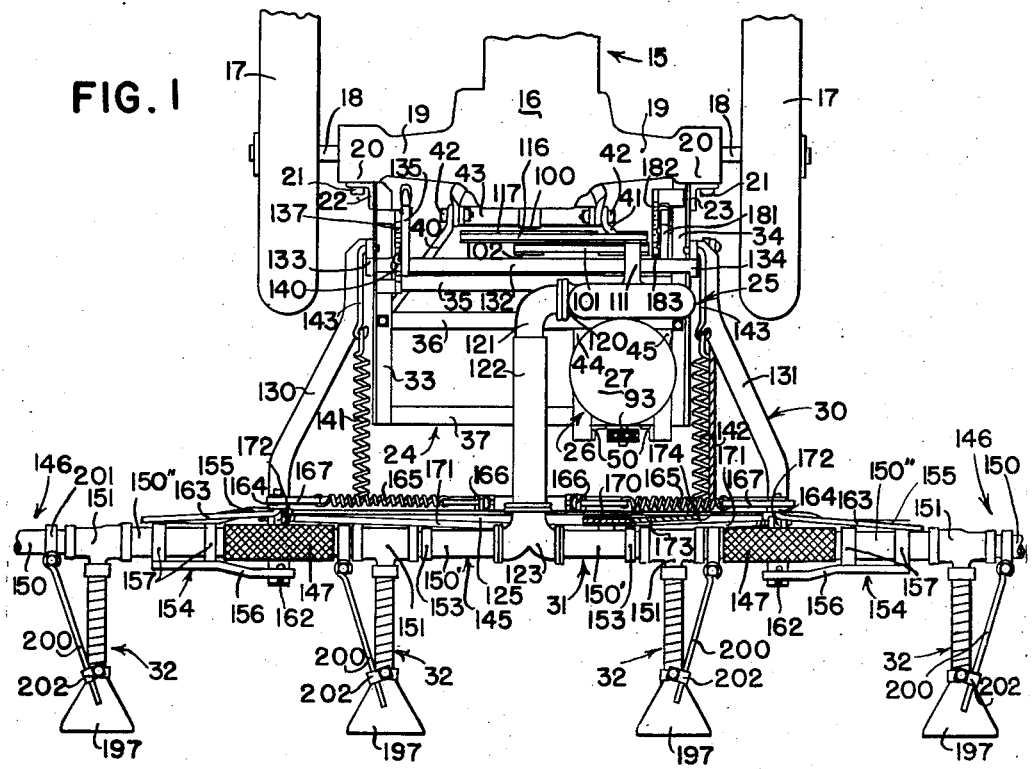

Referring now to the drawings, the duster is mounted on the rear end of a tractor 15 having a body 16 supported on rear traction wheels 17. The wheels 17 are mounted on axles 18 which are journaled in laterally extending axle housings 19. A pair of laterally spaced implement mounting bosses 20 having threaded bolt holes formed therein, are provided on the rear of the axle housings 19, and bolted to these bosses at 21 are vertical angle irons 22 and 23, on which the implement is carried.

The crop duster, in general, comprises a main supporting frame 24 which carries a blower fan 25 and feeding mechanism 26, including a hopper 27 for holding the dusting powder. Pivotally connected to the main frame 24 for vertical swinging movement is a second supporting frame 30 which carries the conduit system 31 distributing the dust-laden air from the blower fan 25 to a plurality of laterally spaced nozzle pipes 32.

The main supporting frame 24 consists of a pair of laterally spaced, fore and aft extending angle irons 33 and 34 which are fixed at their front ends to the upper ends of the members 22, 23, respectively. Cross members 35, 36, and 37 are fixed to the members 33, 34 to form a platform on which the blower fan and feeding mechanism are mounted. The main frame 24 is braced to support the load carried thereon by a pair of bracing members 40 and 41 fixed to the angle irons 33, 34 adjacent the ends of the cross bar 36 and extending downwardly and forwardly therefrom in converging relation. The bracing members 40, 41 are bolted at 42 to opposite sides of the draft frame 43 of the tractor.

The feeding mechanism 26 and hopper 27 are disposed toward the right hand side of the frame 24 and are mounted on top of a supporting stand or platform comprising a pair of laterally spaced legs 44 and 45 which are fixed to the back of the cross piece 36 and extend upwardly therefrom. The legs 44, 45 are bent rearwardly to provide horizontal portions 46 which are supported at their rear ends by angle iron posts 50 fixed to cross piece 37. The hopper 27 is of the type commonly used for distributing fertilizer and is supported on a base 51 which forms a part of a bridge casting 52 extending between the horizontal portions 46 of members 44, 45 and bolted thereto at 53. Fixed to the bottom of the hopper 27 is a ring 54 which is adapted to be secured to the base 51 in any suitable manner as, for example, swivel bolts 55 swingably connected to the base and having wing nuts 56 engageable with slotted lugs 60 on the hopper ring. The base casting 52 is provided with a vertical bore within which is journaled a shaft 61 having a squared upper end 62 and a bevel gear 63 fixed to the lower end thereof. The shaft 61 is driven by mechanism which will be described in detail presently, and mounted on the upper end of the shaft to rotate therewith is a feed plate 64 having a central hub 65 which is provided with a socket the opening of which is square in cross section so as to receive the squared end 62 of the shaft. The dusting material carried within the hopper 27 rests upon the feed plate 64, and as the plate rotates, part of the dusting material rotates with it. Suitable means may be provided, if desired, to agitate and break up solidly packed dust.

The bottom ring 54 is provided with a feed opening 66, and disposed within the opening is a gate member 70. The latter is mounted for pivotal movement toward and away from a position closing the feed opening 66, and to this end the gate is formed with an aperture to receive a pivot pin 71. The pin 71 is inserted through an apertured lug 72 which is formed on the bottom ring 54 and extends radially inwardly therefrom. The gate 70 is formed with an outwardly disposed flange or arm 73 which is apertured and receives the downturned end 74 of a push rod 75. The opposite end of the push rod extends through an apertured lug 76 which is formed integral with the bottom ring 54 and extends outwardly therefrom. Axial, or lengthwise movement of the push rod 75 causes the gate 70 to pivot about the pin 71 as an axis, thereby moving the free end of the gate away from or toward the corresponding end of the opening to open or close the same. The rate of flow of material from the hopper through the feed opening 66 is governed by the extent that the gate is opened, and this is regulated by means of a nut 77 which is threaded on the end of the push rod and engages the lug 76 to limit the movement of the rod in the gate-opening direction. A compression spring 80 embraces the push rod 75 and bears at one end against the lug 76 and at the other end against a washer 81 fixed to the rod, to urge the gate 70 to open position.

The gate 70 can be closed to stop the flow of material through the feed opening by means of a lever 82 which is pivoted at 83 to a bracket 84 that is welded to the platform member 45. A connecting link 85 is fastened at one end by a bolt 86 to the lever 82, and is apertured at the other end to receive the downturned end 74 of the push rod 75 projecting below the flange 73. The link 85 is twisted at its midpoint to provide a vertical portion 87 to lie flat against the side of the lever 82, and a horizontal portion 88 to lie flat against the bottom of the flange 73.

The mechanism for driving the feed plate 64 consists of a gear 90 which meshes with gear 63 and is fixed in any suitable manner to a shaft 91 journaled in fore and aft spaced bearing portions 92 of the base casting 52. Fixed to the rear end of the shaft 91 is a sprocket 93 around which is trained a drive chain 94. The chain 94 is also trained around a second sprocket 95 fixed to the rear end of a fore and aft extending shaft 96 which is journaled in bearings 97 and 98 mounted on frame cross-members 37 and 35, respectively. The shaft 96 is driven from a power take-off shaft 100 projecting rearwardly from the gear housing of the tractor 15 through the agency of a V-belt 101 trained around pulleys 102 and 103 fixed to the shafts 100 and 96, respectively. In order that the feed plate 64 may be driven at a suitably slow speed from the relatively high speed power take-off shaft 100, the pulley 102 is made with a smaller diameter than pulley 103, sprocket 95 has a smaller diameter than sprocket 93, and gear 90 has less teeth than gear 63, each of which relations causes a reduction of rotational speed.

Figure 7:
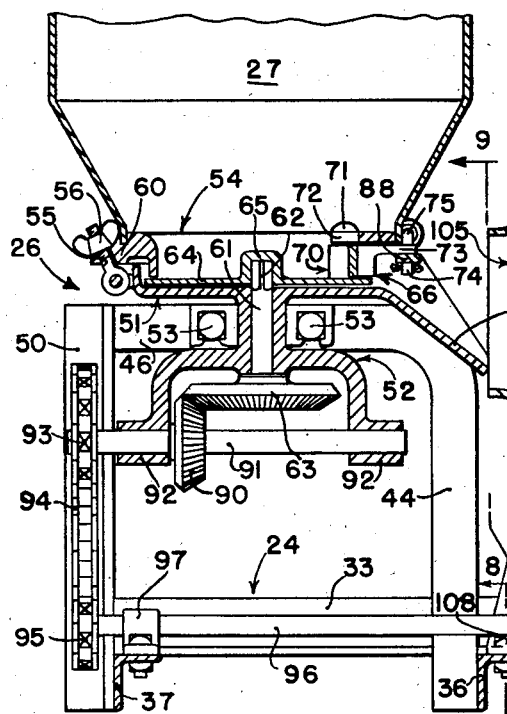
Figure 7 is an enlarged longitudinal vertical section through the feed mechanism and blower fan.
Figure 8:
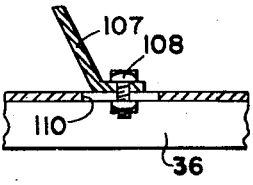
Figure 8 is a sectional view taken along the line 8—8 in Figure 7.
Figure 9:
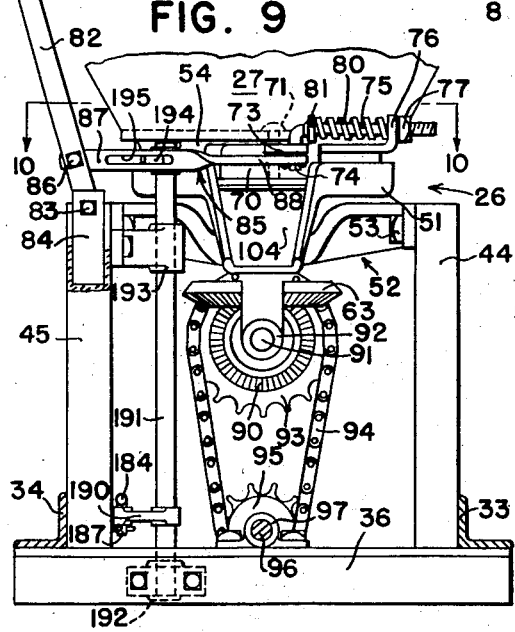
Figure 9 is a sectional view taken along the line 9—9 in Figure 7.

Material that has passed through the feed gate opening 66 drops down a chute 104 formed integral with the base casting 52 into the intake opening 105 of the blower fan 25. The blower 25 comprises a generally circular housing 106 disposed transversely of the frame 24 and having a pair of laterally spaced supporting legs 107, only one of which is shown in Figures 7 and 8. The legs 107 extend across and are bolted to the cross angle irons 35 and 36 by bolts 108 which pass through transversely disposed slots 110 in the horizontal flanges of the angle irons. The purpose of the slots 110 is to allow the fan housing 106 to be shifted laterally to adjust the tension of the fan driving belt. Journaled within a bearing portion 111 of the housing 106 is a shaft 112 on the inner end of which is mounted a spider 113 carrying blades 114. A pulley 115 is mounted on the outer end of the shaft 112, and trained around the pulley is a drive belt 116. The lower end of the belt 116 is trained around a pulley 117 of large diameter fixed to the power take-off shaft 100 ahead of the small pulley 102, or the two pulleys 102 and 117 may be joined together in one piece to form a double pulley.

Figure 2:
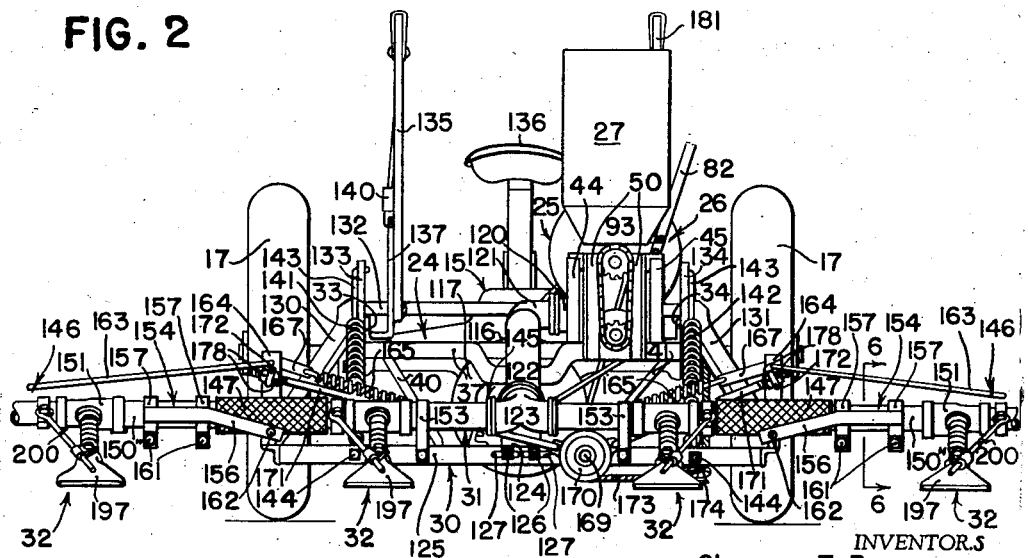
Figure 2 is a rear elevation of the same.

Extending laterally to the left from the bottom of the housing 106 is the exhaust port 120 through which the dust and air from the fan pass. A right angle elbow pipe 121 is swivel-connected to the port 120 for vertical swinging about a transverse axis, and extends rearwardly substantially at the longitudinal center-line of the tractor. The conduit system 31 for conveying the dust-laden air from the fan 25 to the nozzle pipes 32 includes a fore and aft extending duct 122 having a telescopic connection at its front end with the elbow pipe 121, and a T-union 123 fixed to its rear end. The T-union 123 has a downwardly extending flange or bracket portion 124 (Figure 2) which lies against an angle iron cross member 125 of the secondary frame 30 and is secured thereto by bolts 126. The bolts 126 pass through transversely extending slots 127 in the vertical flange of the member 125 which allow the union 123 and duct 122 to be shifted laterally with the blower fan housing 106.

The secondary frame 30 comprises a pair of laterally spaced, generally fore and aft extending members 130 and 131, to which the cross member 125 is fixed near the rear ends thereof. The front ends of the members 130, 131 are rigidly joined, as by welding, to the ends of a transversely disposed shaft 132 which is journaled in a pair of brackets 133 and 134 fixed to the main frame members 33 and 34, respectively. The shaft 132 is disposed ahead of the blower housing 106 and as closely adjacent thereto as possible so as to minimize axial movement of the pipe 122 relative to the elbow 121 when the frame 30 is swung up or down. Such relative movement is due to the fact that the T-union 123, being fixed to the frame 30, travels in an arcuate path about the axis of the shaft 132 as a center, while the duct 122 and elbow 121 swing about the axis of the exhaust port 120 as a center. The telescopic connection between the pipe 122 and elbow 121 accommodates this relative movement.

The secondary frame 30 and conduit system carried thereby are rocked between the lowered position, shown in solid lines in Figure 3, and the raised position, shown in broken lines, by means of a hand lever 135 which is welded to the shaft 132 adjacent the left end thereof and extends upwardly to a point within convenient reach of the operator seated on the tractor seat 136. The lever 135 is held in adjusted position by a notched sector 137 fixed to the main frame member 33 in any suitable manner, which is engaged by a grip-release latch 140 on the lever. A pair of counterbalancing springs 141 and 142 are connected by means of links 143 to brackets 133, 134, respectively, at points well above the axis of the shaft 132, and are fastened to the cross member 125 of the secondary frame by bolts 144. The counterbalancing springs 141, 142, being connected to the main frame above the axis of swinging movement, are stressed in tension by the weight of the secondary frame 30 and act to support a portion of the load to expedite raising and lowering the frame with the hand lever 135.

The portion of the conduit system 31 mounted on the rear of the secondary frame 30 transverse to the direction of forward travel is designated in its entirety as the distributor pipe, and consists of a central portion 145 and two outrigger portions 146 connected to the laterally outer ends thereof by flexible boots 147 of fabric, rubber, or other suitable material. Both the central portion 145 and outrigger portions 146 of the distributor pipe are made up of short lengths of pipe 150 rigidly joined together by unions 151 to form a continuous pipe of gradually outwardly diminishing diameter. Each of the unions 151 is formed with a rearwardly extending branch 152 to which one of the nozzle pipes 32 is connected. The two inner pipes 150' of the central portion 145 are telescopically connected with the opposite ports of the T-union 123 to accommodate the lateral movement of the same, and are further supported by means of brackets 153 which embrace the pipes and are bolted to the frame cross member 125.

Each of the outrigger portions 146 is supported on a vertically swingable cradle or frame 154 comprising a pair of fore and aft spaced, transversely extending bars 155, 156 disposed on opposite sides of the inner pipe 150". The bars 155, 156 are welded to a pair of laterally spaced clamps 157 in the form of straps embracing the pipe 150". The ends of the straps are bent downwardly beneath the pipe 150" to form a pair of adjacent ears 160 which are apertured to receive a bolt 161 for tightening the clamp about the pipe. The bars 155, 156 extend inwardly toward the central portion 145 of the distributor pipe and downwardly, and are apertured at their ends to receive pivot pins 162 which are fixed to the frame members 130, 131 in fore and aft alignment. The pivot pins 162 are positioned substantially at the midpoint of the associated flexible boot 147 to minimize distortion of the latter when the outrigger is swung up to the raised position, as shown in Figure 3. By loosening bolts 161 to relax the grip of the clamps 157 on the pipe 150", the latter can be turned in the clamps or moved axially relative thereto to adjust the positions of the nozzle pipes 32. The boot 147 is merely clamped to the outrigger pipe by any suitable clamps (not shown) and can, therefore, be adjusted to accommodate any such movement of the outrigger relative to its supporting cradle.

The outriggers 146 are supported against sagging under their own weight by rods 163, each of which is suitably fastened at its outer end to the outrigger pipe and at its inner end is hooked through an aperture in an upright lever arm 164 welded to the cradle bar 155. The outriggers are raised and lowered by lifting mechanism which will be described in detail presently, and said lifting mechanism is assisted by a pair of counterbalancing tension springs 165 anchored to brackets 166 fixed to the frame cross bar 125 near the midpoint thereof. The springs 165 are hooked through links 167 which are apertured to receive the forwardly turned ends of the rods 163 in front of the bars 164.

The outrigger lifting mechanism consists of a crank in the form of a sheave wheel 170 journaled on the frame cross bar 125 for rotation about a fore and aft extending axis 169. Pivotally connected to the sheave wheel at axially spaced points thereon are connecting rods 171, the outer ends of which pass through the eyes of eyebolts 172 pivoted to the lever arms 164. Each of the connecting rods 171 has a pair of nuts 178 threaded on the outer end thereof on opposite sides of the eyebolt 172, by means of which the eyebolt can be adjusted along the connecting rod to raise or lower the outer end of the outrigger when in lowered position. When the sheave wheel crank is rotated, the connecting rods pull the lever arms 164 in toward the center, thereby swinging the outriggers up to raised position. In the lowered position the connecting rods 171 assume a dead-center position with respect to the axis of the sheave wheel 170 so that the outriggers are held down and prevented from oscillating up and down when the implement travels over rough ground.

The sheave wheel 170 is rotated by means comprising a cable 173 which is fastened to and is trained around the sheave wheel. The cable 173 passes around a pulley 174 journaled on the frame member 125 substantially in line with the right edge of the main frame 24, and extends forwardly therefrom, passing under another pulley 175 journaled on the frame member 131. The front end of the cable 173 is fastened to the upper end of an arm 176 (Figure 3) which is welded or otherwise fixed to the outer end of a transverse shaft 177 journaled in brackets 180 fixed to the frame cross member 35. A hand lever 181 is fixed to the inner end of the shaft 177 and extends upwardly therefrom to a point within convenient reach of the operator seated on the tractor seat 136. To raise the outriggers, the operator pushes the lever 181 forwardly, rocking the shaft 177 in a clockwise direction (Figure 3) and pulling the cable 173 forwardly. As the cable is pulled forwardly it is unreeled from the sheave wheel 170, causing the latter to rotate in a counter-clockwise direction (Figure 2) and cranking the outriggers up to the raised position. The outriggers can be held in any position of raised adjustment by means of a notched sector 182 which is fixed to the main frame 24 in any suitable manner and which is engaged by a grip-release latch 183 on the lever 181.

Figure 10:
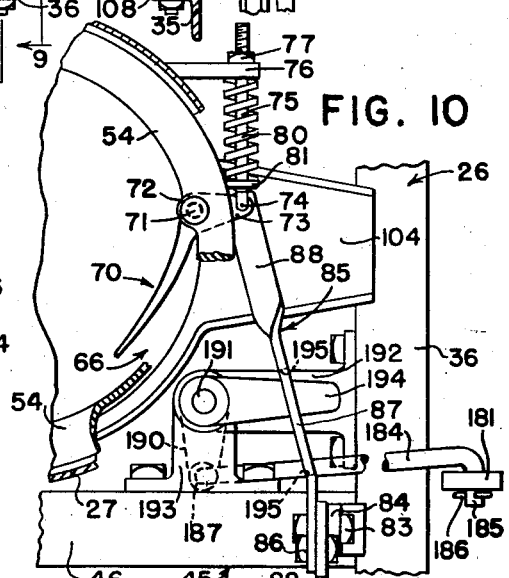
Figure 10 is a horizontal section taken along the line 10—10 in Figure 9.

The flow of material from the hopper 27 through the feed opening 66 and into the fan intake 105 is automatically interrupted when the outriggers are raised by means of a linkage arrangement between the lever 181 and the feed gate 70 which will now be described. A rod 184 has its front end bent laterally outwardly at 185 and inserted through an aperture in the outrigger lifting lever 181, being secured therein by a cotter pin 186 (see Figure 10). The rear end of the rod 184 is turned downwardly at 187 and is inserted through an aperture in a lever arm 190 fixed to the lower end of a vertically disposed shaft 191 which is journaled in bearing brackets 192 and 193 bolted to members 36 and 45, respectively. Fixed to the upper end of the shaft 191 is a forwardly extending lever arm 194 which passes through a slot 195 in the vertical portion 87 of the link 85. When the lever 181 is in its rearwardmost position, i. e., when the outriggers are down, and when the feed gate 70 is in its normal open position, the lever arm 194 is disposed in the end of the slot 195 nearest the connection of the link 85 with the feed gate flange 73. The slot 195 thus provides a lost motion connection between the lever arm 194 and the link 85, and enables the gate 70 to be closed by the lever 82 without interfering with the lever arm 194. When the outriggers 146 are raised by moving the lever 181 forwardly, however, the shaft 191 is rotated in a counter-clockwise direction (Figure 10) causing the lever arm 194 to engage the end of the slot 195 and move the link 85 against the pressure of the spring 80, thereby closing the gate 70. Moving the lever 181 rearwardly again to lower the outriggers causes the shaft 191 to rotate in a clockwise direction and the link 85, being urged in the same direction by the spring 80, follows the lever 194 until the lug 76 is engaged by the nut 77. Thus, the flow of material from the hopper 27 into the blower 25 is automatically cut off when the outriggers are raised, and is resumed again when they are lowered to operative position.

The nozzle pipes 32 are preferably made of flexible metal tubing 196 of well known spiral wound construction. One end of the tubing is inserted into the rearwardly extending branch 152 of the union 151 and is secured therein in any suitable manner. The other end of the tubing is inserted into a fish-tail pipe 197 which serves to discharge the dust-laden air in a broad ribbon-like stream over the row of crop. The discharge end of the nozzle pipe is supported in adjusted position by means of a rod 200 which is held at one end by a mounting bracket 201 on the distributing pipe 150 and has a holder 202 at the other end thereof fixed to the fish-tail pipe 197. The mounting bracket 201 consists of a metal strap which is wrapped around the pipe 150, the ends of said strap being bent rearwardly at the back of the pipe to form a pair of adjacent ears 203. The ears are apertured to receive a clamping bolt 204, and the latter is passed through a loop 205 formed in the end of the rod 200. Thus, when the bolt 204 is tightened, the strap is clamped tightly about the pipe 150 and the rod 200 is clamped tightly to the ears 203 of the strap. By loosening the bolt 204, however, the strap 201 can be moved axially along the pipe 150, as shown in Figure 4, or turned on the pipe, as shown in Figure 5, and the rod 200 is free to accommodate itself to the new position. The holder 202 is likewise a metal strap which is wrapped around the rod 200 and is secured to the fish-tail pipe by a bolt 206 passing through the apertured ends of the strap and threaded into the pipe 197. The holder 202 is slidable along the rod 200 and rotatable thereon when the bolt 206 is loosened, and is also rotatable about the axis of the bolt.

It is believed that the operation of our improved crop duster and the advantageous features thereof will be clearly understood from the foregoing description, and what we claim as our invention is:

1. A crop duster comprising a frame having blower and feeding mechanism mounted thereon, conduit means connected with said blower and including a distributing pipe supported on said frame transverse to the line of forward travel, a plurality of flexible nozzle pipes connected with said distributing pipe at axially spaced points thereon, and adjustable means for supporting the discharge ends of said nozzle pipes, said means comprising a plurality of rods disposed one to each of said nozzle pipes, each of said rods having a mounting bracket at one end thereof clamped to said distributing pipe and a holder at the other end fixed to the associated nozzle pipe, means accommodating rotation of the rod relative to the mounting bracket about an axis extending generally transversely of the distributing pipe for adjustably securing each rod to the associated mounting bracket, each of said holders being rotatable relative to the associated nozzle about an axis extending generally transversely thereof and shiftable generally longitudinally of the associated rod, said mounting bracket being shiftable axially along said distributing pipe so as to change the lateral position of the end of the associated nozzle pipe and rotatable relative thereto so as to swing the end of the associated nozzle pipe generally in a vertical direction about the axis of said distributing pipe.

2. A crop duster comprising a main frame having blower and feeding mechanism mounted thereon, a second frame pivoted on said main frame for vertical swinging movement, a duct carried on said second frame and movable vertically therewith, conduit means connecting one end of said duct with said blower and providing for relative movement therebetween, a distributing pipe extending laterally from the other end of said duct and connected therewith by means including a flexible hose, a support pivoted on said second frame for vertical swinging movement about an axis adjacent said flexible hose, said distributing pipe being mounted on said support by means providing for rotation and axial movement of the pipe relative thereto, a plurality of flexible nozzle pipes connected with said distributing pipe at axially spaced points thereon, and means for supporting the discharge ends of said nozzle pipes in adjusted position, said means comprising a plurality of brackets clamped to said distributing pipe and movable relative thereto in an axial direction and about the axis thereof, each of said brackets being positioned adjacent one of the nozzle pipes and each bracket having a rod associated therewith, said rod being swingable laterally with respect to the bracket, means for fixedly securing the rod to the bracket in adjusted position, and a holder on the outer end of said rod connected with the outer end of its associated nozzle pipe.

3. A crop duster comprising a mobile supporting frame, a distributing pipe mounted on said frame transverse to the direction of forward travel, a drive shaft having a belt pulley fixed thereto, a fan blower mounted on the frame with the fan shaft parallel to said drive shaft and spaced radially therefrom, a belt pulley fixed on the fan shaft, a driving belt trained around said pulleys, a duct connected at one end with said blower and having a union at the other end thereof telescopically connected with said distributing pipe, and means whereby the blower and the associated duct and union may be shifted relative to said frame in a direction perpendicular to the axis of said drive shaft to adjust the tension of the driving belt, said distributing pipe telescoping within the union to accommodate the movement of the latter relative to the pipe.

4. A crop duster comprising a main frame, a second frame pivotally connected with said main frame for vertical swinging about a transverse axis, a transversely arranged distributing pipe mounted on said second frame and movable vertically therewith, a blower having a fan shaft, a drive shaft, belt pulleys fixed to the drive shaft and fan shaft, respectively, a driving belt trained around said pulleys, a duct connected at one end with said blower by means providing for relative swinging movement therebetween, a union at the other end of said duct providing a telescopic connection between the duct and said distributing pipe, means for mounting said blower on said main frame providing for shifting of the blower and duct relative thereto in a direction to adjust the tension of said driving belt, and means for connecting said union to said second frame providing for shifting of the union relative thereto in said direction, said distributing pipe telescoping within the union to accommodate the movement of the latter relative to the pipe.

5. A crop duster comprising a mobile supporting frame having blower and feeder mechanism mounted thereon, supporting means pivoted on said frame for vertical swinging movement in a transverse vertical plane, a transversely extending distributing pipe mounted on said supporting means and swingable vertically therewith, conduit means connecting said distributing pipe with said blower providing for relative swinging movement therebetween, a sheave wheel journaled on said frame, a cable fixed to and trained around said sheave wheel, a link having one end pivotally connected with the sheave wheel at a point spaced radially from the axis thereof and the other end connected with said supporting means whereby the latter and distributing pipe are swung upwardly when the sheave wheel is turned, and means for exerting a pull on the cable to rotate the sheave wheel.

6. A crop duster comprising a main frame having blower and feeding mechanism mounted thereon, a second frame pivoted on said main frame for vertical swinging movement, a duct carried on said second frame and movable vertically therewith, conduit means connecting one end of said duct with said blower and providing for relative movement therebetween, a pair of opposed laterally extending distributing pipes, each of said pipes being mounted on said second frame for vertical swinging movement therewith, means connecting said distributing pipes with said duct providing for relative movement therebetween, a sheave wheel journaled on said second frame, a cable fixed to and trained around said sheave wheel, a pair of links pivotally connected with the sheave wheel at angularly spaced points thereon, each of said links being connected with the associated distributing pipe whereby the latter is swung upwardly to transport position when the sheave wheel is rotated, said links assuming positions substantially at dead-center with respect to the axis of the sheave wheel when the distributing pipes are down in operative position whereby the pipes are prevented from oscillating up and down as the implement travels over rough ground, and means for exerting a pull on said cable to rotate the sheave wheel.

7. A crop duster comprising a supporting frame having a blower mounted thereon, conduit means connected with said blower and including a distributing pipe mounted on the frame for relative vertical movement, lifting means for raising and lowering said distributing pipe, a feed hopper mounted on said frame and having a discharge opening communicating with said conduit means, a gate movable between an open position permitting material to flow through said discharge opening and a closed position blocking the opening, and means including lost motion means controlled by said lifting means for moving said gate to closed position when said distributing pipe is raised, said lost motion means accommodating the movement of said gate to one position independent of the position of said distributing pipe.

8. An agricultural machine comprising a supporting frame, conduit means carried on said frame including a distributing pipe adapted for vertical movement relative to the frame about an axis, said conduit means including vertically swingable outrigger sections movable in any position of said distributing pipe, elevating means for raising and lowering said distributing pipe, means including a member mounted on said frame adjacent said axis for shifting said outrigger sections, a feed hopper mounted on said frame and having a discharge opening communicating with said conduit means, a gate mounted for movement between an open position permitting material in the hopper to flow through said discharge opening and a closed position blocking the opening, and means connected with said gate and with said member for moving said gate to closed position when the outrigger sections are raised.

9. An agricultural machine comprising a supporting frame, conduit means carried on said frame including a distributing pipe adapted for vertical movement relative to the frame, elevating means for raising and lowering said distributing pipe, a feed hopper mounted on said frame and having a discharge opening communicating with said conduit means, a gate mounted for movement between an open position permitting material in the hopper to flow through said discharge opening and a closed position blocking the opening, manually operable control means connected with said gate and extending to a point adjacent the operator's station for opening and closing the gate, and additional control means operable to close the gate when the distributing pipe is raised and to open the gate when the distributing pipe is lowered.

10. A crop duster comprising a hopper, a movable gate controlling the flow of material therefrom, a blower adapted to receive material, a laterally extending nozzle unit receiving the discharge from said blower and including a generally upwardly movable section adapted to be moved about an axis into a number of operating positions and about another axis into an inoperative position, means for moving said section about said first axis into different operating positions, and means connected between said nozzle section and said movable gate and including a part extending adjacent said first axis whereby when said section is moved about said first axis said gate remains in open position but is moved into its closed position when said section is moved about its second axis.

11. A crop duster comprising a hopper, a gate controlling the flow of material therefrom, a blower adapted to receive material, distributing means receiving the discharge from said blower, means for raising said distributing means to transport position, means controlled concomitantly with said raising means for closing said gate whenever said distributing means is moved into its transport position, and means for closing said gate independently of the position of said distributing means.

12. A crop duster comprising a main frame, a blower and material feeding mechanism mounted on said main frame, supporting means pivoted to said main frame for movement relative thereto about an axis, conduit means on said pivoted supporting means and flexibly connected to receive material from the blower on said main frame, said conduit means including a central section and an outer swingable section, and means for swinging the latter in any position of said pivoted supporting means comprising a part passing close to the axis of pivotal connection of said supporting means.

13. A crop duster comprising a main frame, a blower and material feeding mechanism mounted on said main frame, supporting means pivoted to said main frame for movement relative thereto about an axis, conduit means on said pivoted supporting means and flexibly connected to receive material from the blower on said main frame, said conduit means including a first section fixed to said supporting means and a second section swingably connected with said first section, means on said supporting means for swinging said second conduit section, means on said main frame for actuating said swinging means, and means connecting said actuating means with said swinging means including a sheave supported adjacent said axis and a cable trained over said sheave.

14. A crop duster comprising means serving as a main frame, supporting frame means adapted to be pivoted at its front end to said main frame means forward of the rear end of the latter, material distributing means carried by said supporting frame means and including a central conduit and means for supplying material thereto, a material container and blower carried by said main frame generally rearwardly of the pivot axis of said supporting frame means, said blower being connected with said material supplying means adjacent said axis, said supporting frame means including a transverse frame bar normally disposed rearwardly of said main frame means and a pair of generaly longitudinally extending frame bars fixed to said transverse frame bar and extending rearwardly of the latter, means connecting the front ends of said longitudinally extending frame bars with said main frame means, a pair of vertically swingable conduit sections connected with the ends of said central conduit, and support means for said conduit sections pivotally connected with the rearward extensions of said longitudinally extending frame bars rearwardly of said transverse bar.

15. A crop duster comprising supporting frame means, material distributing means carried by said supporting frame means and including a central conduit and means for supplying material thereto, said frame means including a transverse frame bar and a pair of generaly longitudinally extending frame bars fixed to said transverse frame bar and extending rearwardly of the latter, a pair of brackets fixed to said transverse frame bar for supporting said central conduit in a position generally upwardly and rearwardly of said transverse frame bar, a pair of verticaly swingable conduit sections connected with the ends of said central conduit, a pair of parts fixed at opposite sides to each of said swingable conduit sections, and pivot bracket means fixed to each of the rearward extensions of said longitudinally extending frame bars and pivotally receiving the pair of parts connected to the associated swingable conduit section.

16. A crop duster comprising supporting frame means, material distributing means carried by said supporting frame means and including a central conduit and means for supplying material thereto, said frame means including a transverse frame bar and a pair of generally longitudinally extending frame bars fixed to said transverse frame bar, a pair of brackets fixed to said transverse frame bar for supporting said central conduit, a pair of vertically swingable conduit sections connected with the ends of said central conduit, a pair of parts fixed at opposite sides to each of said swingable conduit sections, pivot bracket means fixed to the rear end portions of said longitudinally extending frame bars and pivotally receiving the pair of parts connected to the associated swingable conduit section, an arm fixed to one part of each of said pairs of parts, and means connected with said arms for swinging said conduit sections.

17. A crop duster comprising supporting frame means, material distributing means carried by said supporting frame means and including a central conduit and means for supplying material thereto, said frame means including a transverse frame bar and a pair of generally longitudinally extending frame bars fixed to said transverse frame bar, a pair of brackets fixed to said transverse frame bar for supporting said central conduit, a pair of vertically swingable conduit sections connected with the ends of said central conduit, a pair of parts fixed at opposite sides to each of said swingable conduit sections, pivot bracket means fixed to the rear end portions of said longitudinally extending frame bars and pivotally receiving the pair of parts connected to the associated swingable conduit section, an arm fixed to one part of each of said pairs of parts, an operating member mounted on the central part of said transverse frame member, and means connecting said operating member with said arms for swinging said conduit sections.

18. In a crop duster or the like, material distributing conduit means comprising a central section and outer sections, each pivotally connected with the central section for generally vertical movement relative thereto about an axis, a rotatable member having arm portions, links connecting said arm portions with said pivoted conduit sections, said arm portions and links being arranged in substantially straight line relation so as to lock said pivoted conduit sections in one position, and means for rotating said rotatable member so as to swing said pivoted conduit sections into other positions.

19. In a crop duster or the like, supporting means, material distributing conduit means comprising a central conduit section carried by said supporting means and outer sections, each pivotally connected with the central section for generally vertical movement relative thereto about an axis, a rotatable member mounted on said supporting means and having arm portions, links connecting said arm portions with said pivoted conduit sections, said arm portions and links being arranged in substantially straight line relation so as to lock said pivoted conduit sections in extended position, and means on said supporting means for rotating said rotatable member so as to swing said pivoted conduit sections into their raised position.

20. In a crop duster, supporting means, a pair of conduit pipes carried thereby, a T-connection telescopically associated with the adjacent ends of said conduit pipes and mounted for movement on said supporting means generally in a direction longitudinally of said conduit pipes, a material feeding and blower unit mounted on said supporting means for movement relative thereto in said direction, and means connecting said T-connection with said material feeding and blower unit for movement therewith.

21. A crop duster comprising a main frame, a second frame pivotally connected with said main frame for movement about an axis, a distributing pipe mounted on said second frame and movable therewith, a blower having a discharge port extending adjacent and generally parallel to said axis, an elbow swivel-connected to said port for swinging about the axis of the latter, and a conduit supplying material to said distributing pipe having a telescopic connection with said elbow and carried by said second frame and movable with the latter about said first-named axis.

22. Dusting apparatus comprising supporting means, a distributing pipe mounted thereon, a blower mounted on said frame means for movement relative thereto, drive means for said blower arranged to be adjusted by movement of said blower relative to said frame, and a duct connected at one end with said blower and having a union at the other end thereof telescopically connected with said distributing pipe, and blower and associated duct and union being shiftable relative to said frame in a direction generally parallel to said distributing pipe to adjust said drive means.

23. Dusting aparatus as set forth in claim 22, further characterized by said distributing pipe comprising two sections and said union being disposed generally between and telescopically associated with said two pipe sections.

24. A crop duster comprising a main frame having blower and feeding mechanism mounted thereon, a second frame pivoted on said main frame for vertical swinging movement, a duct carried on said second frame and movable vertically therewith, conduit means connecting one end of said duct with said blower and providing for relative movement therebetween, a distributing pipe extending laterally from the other end of said duct and connected therewith by means including a flexible hose, a support pivoted on said second frame for vertical swinging movement about an axis adjacent said flexible hose, and means providing for rotation and axial movement of the distributing pipe relative to said support for mounting said distributing pipe on said support.

25. In a crop duster or the like, material distributing conduit means comprising a central section and outer sections, each pivotally connected with the central section for generally vertical movement relative thereto about an axis, a shiftable member for raising and lowering said outer sections, and means actuated by movement of said shiftable member into a given position for locking said pivoted conduit sections in lowered position.

26. A crop duster comprising supporting frame means, material distributing means carried by said supporting frame means and including a central conduit and means for suplying material thereto, said frame means including a transverse frame bar and a pair of generally longitudinally extending frame bars, a pair of brackets fixed to said transverse frame bar for supporting said central conduit in a position generally upwardly and rearwardly of said transverse frame bar, a pair of vertically swingable conduit sections connected with the ends of said central conduit, a pair of parts fixed at opposite sides to each of said swingable conduit sections, and pivot bracket means fixed to each of said longitudinally extending frame bars and pivotally receiving the pair of parts connected to the associated swingable conduit section.

27. A crop duster comprising supporting frame means, material distributing means carried by said suporting frame means and including a central conduit and means for supplying material thereto, said frame means including a transverse frame bar and a pair of generally longitudinally extending frame bars fixed to said transverse frame bar and extending rearwardly of the latter, a pair of brackets fixed to said transverse frame bar for supporting said central conduit in a position generally upwardly and rearwardly of said transverse frame bar, a pair of vertically swingable conduit sections connected with the ends of said central conduit, a pair of parts fixed at opposite sides to each of said swingable conduit sections, means providing for rotating said swingable conduit sections about their longitudinal axes relative to said parts, nozzles carried by said sections and adapted to extend downwardly in rear of said transverse frame bar, and pivot bracket means fixed to each of the rearward extensions of said longitudinally extending frame bars and pivotally receiving the pair of parts connected to the associated swingable conduit section.

28. A crop duster comprising a main frame, a second frame pivotally connected with said main frame for movement about an axis, a distributing pipe mounted on said second frame generally parallel to and spaced rearwardly from said axis and movable with said frame, a blower having a discharge port extending adjacent and generally parallel to said axis, a conduit fitting swivel-connected to said port for swinging about the axis of the latter, a conduit for receiving material from said fitting and extending generally rearwardly from said blower toward said distributing pipe, and a fitting connecting the rear end of said conduit with said distributing pipe, said conduit having a telescoping connection with at least one of said fittings so as to accommodate movement of said second frame about its axis and movement of said conduit about the axis of said blower discharge port.

29. A crop duster comprising a main frame, a second frame pivotally connected with said main frame for movement about an axis, a distributing pipe mounted on said second frame generally parallel to and spaced rearwardly from said axis and movable with said frame, a blower having a discharge port, means supporting said blower on said main frame with said discharge port extending adjacent and generally parallel to said axis, a conduit fitting swivel-connected to said port for swinging about the axis of the latter, a conduit connected at its front end to said conduit fitting and extending toward said distributing pipe, and a fitting connecting the rear end of said conduit with said distributing pipe, said conduit having a telescoping connection with one of said fittings so as to accommodate movement of said second frame about its axis and movement of said conduit about the axis of said blower discharge port.

CLARENCE T. RASMUSSEN.
ROBERT D. GRIFF.